G. I. WICKS.
CLUTCH.
APPLICATION FILED DEC. 7, 1918.

1,438,073.

Patented Dec. 5, 1922.
2 SHEETS—SHEET 1.

Witness
Chas W. Stauffiger
Karl H. Butler

Inventor
George Ira Wicks.

By
Parker & Parker
Attorneys

G. I. WICKS.
CLUTCH.
APPLICATION FILED DEC. 7, 1918.

1,438,073.

Patented Dec. 5, 1922.
2 SHEETS—SHEET 2.

Witness
Chas. W. Stauffer
Karl H. Butler

Inventor
George Ira Wicks,
By
Attorneys

Patented Dec. 5, 1922.

1,438,073

UNITED STATES PATENT OFFICE.

GEORGE IRA WICKS, OF FLINT, MICHIGAN.

CLUTCH.

Application filed December 7, 1918. Serial No. 265,688.

*To all whom it may concern:*

Be it known that I, GEORGE IRA WICKS, a citizen of the United States of America, residing at Flint, in the county of Genesee and State of Michigan, have invented certain new and useful Improvements in Clutches, of which the following is a specification, reference being had therein to the accompanying drawings.

This invention relates to clutches, and has special reference to that type of clutch adapted for establishing a driving relation between alining shafts or rotary members whereby one shaft or member may be utilized for imparting a rotary movement to the other shaft or member.

The principal object of my invention is to provide a clutch embodying an external member and having internal shiftable jaws or shoes adapted for rotative continuity with a shaft and when shifted into engagement with the external member, adapted to establish a driving relation between said shaft and a shaft or member connected to said external member. The invention is particularly characterized by jaw or shoe shifting means operatable through a member which establishes a driving relation between the jaws or shoes and the shaft or member supporting the same, and furthermore, by jaws or shoes that have a positive and non-slipping engagement with an external member, in contradistinction to a frictional engagement which is common in many clutches.

The above and other objects are attained by a mechanical construction that will be hereinafter specifically described and then claimed, and reference will now be had to the drawings, wherein—

Figure 1:
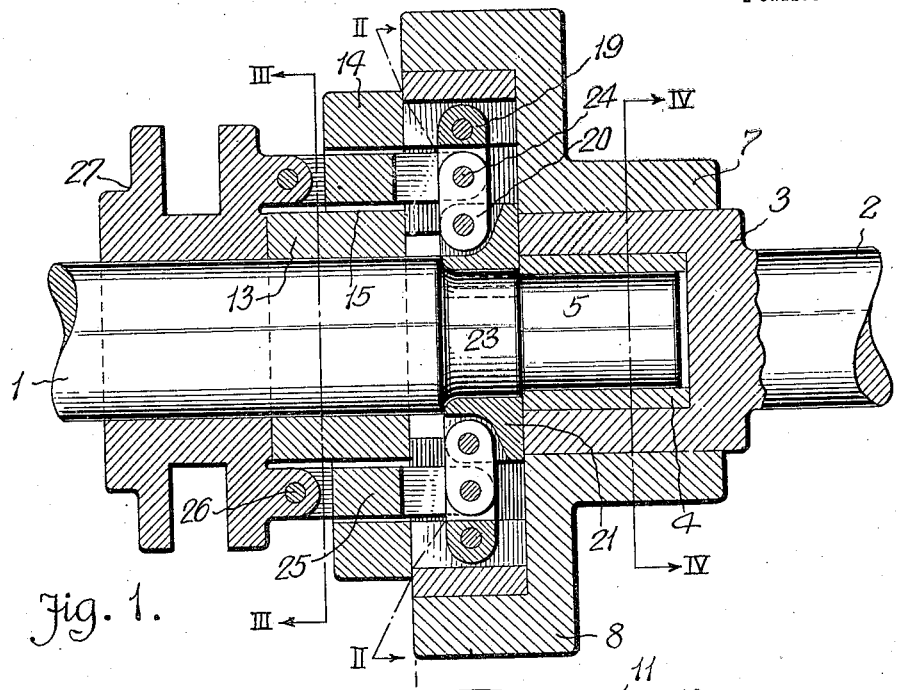
Figure 1 is a longitudinal sectional view of a clutch.

In the drawings, the reference numerals 1 and 2 denote alining shafts, either of which may be a drive shaft, but for the sake of clearness in describing my invention, I will consider the shaft 1 the drive shaft and the shaft 2 the driven shaft. The driven shaft 2 has a socket 3 provided with a bushing 4, and the extreme end 5 of the drive shaft 1 is journaled in the bushing 4.

Mounted on the socket 3 and held for rotation therewith by keys 6 or other fastening means is the hub portion 7 of an external clutch member 8, said clutch member having an annular inner wall 9 provided with a plurality of inserts or abutments 10 that may be held by screws 11 or other fastening means.

Fixed on the drive shaft 1 by keys 12 or other fastening means is the hub 13 of a jaw or shoe driving member 14, said member having a plurality of equally spaced openings 15 about the hub 13. The hub 13 protrudes from the outer face of the member 14 and the inner face of said member is provided with a plurality of sector shaped enlargements 16, which extend into the external clutch member 8.

Figure 2:
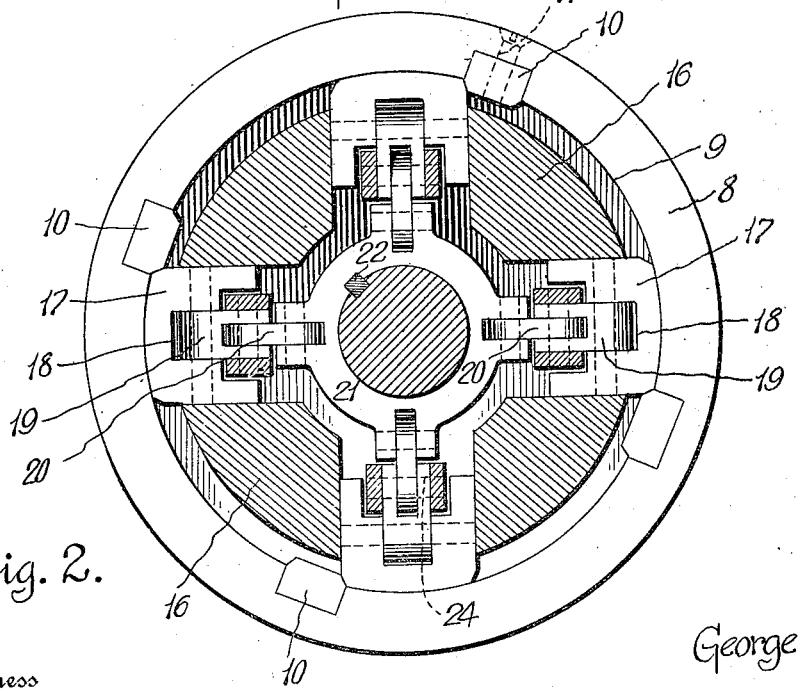
Fig. 2 is a cross sectional view taken on the line II—II of Fig. 1.
Figure 3:
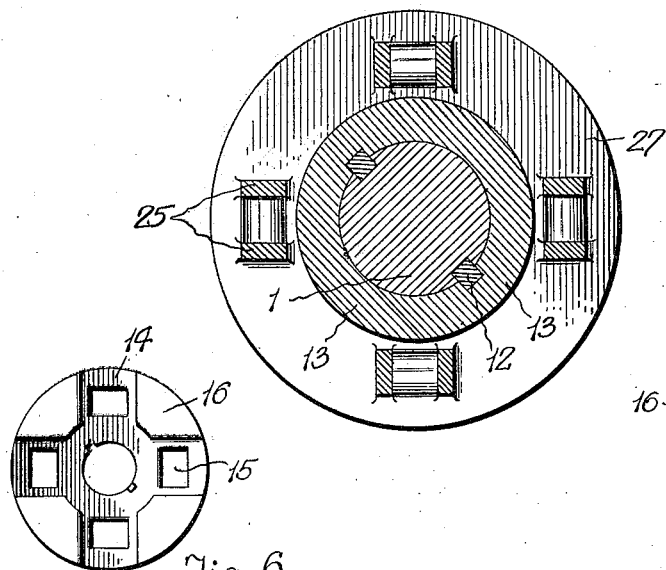
Fig. 3 is a similar view taken on the line III—III of Fig. 1.
Figure 6:
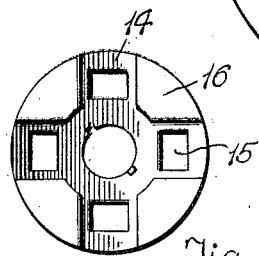
Fig. 6 is a side elevation of the detached jaw or shoe driving member.
Figure 7:
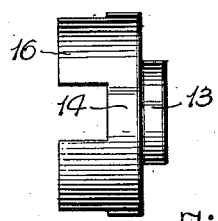
Fig. 7 is an end view of the same.
Figure 4:
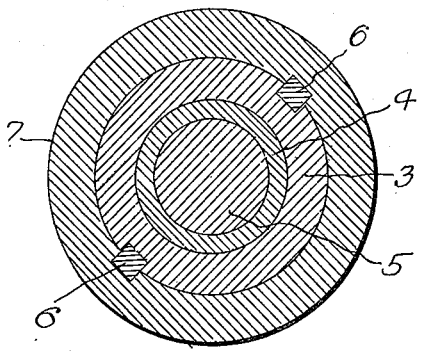
Fig. 4 is a similar view taken on the line IV—IV of Fig. 1.
Figure 5:
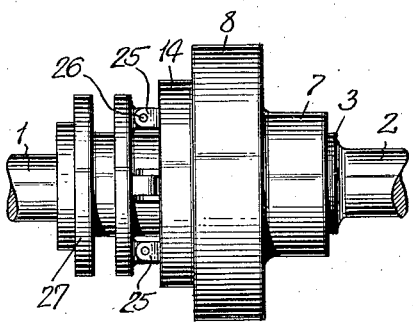
Fig. 5 is a side elevation of the clutch.

Slidable between the confronting faces of the sector shaped enlargements are jaws or shoes 17 adapted to engage the inner wall 9 of the member 8 and more particularly the inserts or abutments 10, as shown in Fig. 2 of the drawing. The inner ends of the jaws or shoes are recessed, as at 18, and pivotally mounted in the recesses 18 are articulated toggle members 19 and 20. The inner ends of the toggle members 20 are pivotally connected to a collar 21 keyed or otherwise fixed, as at 22, on the reduced portion 23 of the drive shaft 1.

The toggle members 19 and 20 are connected by a pin 24 and pivotally connected to said pin is the inner end of an H-shaped link 25 that extends through one of the openings 15 of the jaw or shoe driving member 14. The outer ends of the links 25 are pivotally connected, as at 26, to lugs carried by a shiftable member 27 loose on the drive shaft 1 against the hub 13 of the member 14.

The shiftable member 27 is of a conventional form adapted to be reciprocated upon the drive shaft 1 by a forked lever or other means, (not shown).

The clutch has been illustrated as set to establish rotative continuity or a driving relation between the shafts 1 and 2, insomuch, that the jaws or shoes 17 are positioned between the confronting faces of the enlargements 16 and engage the inserts or abutments 10 of the external clutch member 8. To release the jaws or shoes relative to the external clutch member 8, the shiftable member 27 is moved away from the hub 13 of the driving member 14; the links 25 breaking down the toggle members so as to retract the jaws or shoes 17 sufficiently to provide clearance for the inserts or abutments 10. The shafts 1 and 2 may then revolve independent of each other, or one shaft remain stationary while the other is driven.

I attach considerable importance to the compact arrangement of the jaws and shoes, particularly the actuating mechanism thereof, as all the parts have been constructed and assembled to withstand any excessive stresses or strains that may be set up during the driving of one shaft by the other. Furthermore, the factor of slippage of the jaws or shoes relative to the external clutch member is entirely eliminated and a positive driving relation is established when the jaws or shoes engage the inserts or abutments of the external clutch member.

As shown, the abutments 10 have faces inclined to the direction of length of a jaw face, the jaws having complemental faces. These complemental faces provide the contacting faces of the engaged jaw and abutment, this particular arrangement serving to eliminate any tendency of a jaw and abutment to bind in such manner as to prevent ready withdrawal of the jaws at will. Furthermore, such inclination serves to increase the area of contact without necessitating the use of elongated abutments such as would require a lengthy withdrawal movement of the jaws, the result being that the structure permits of the use of the toggle principle while retaining the advantage of a comparatively small and compact arrangement of clutch, the parts being capable of design in a manner to take care of the heavy duty service which this form of clutch is designed to meet, it being understood that the use of spaced-apart abutments, enables the structure of abutments and jaws to be sufficiently rugged to produce this result.

While in the drawing there is illustrated a preferred embodiment of my invention, it will be understood that the structural elements are susceptible to such variations and modifications as fall within the scope of the appended claims.

What I claim is:—

1. In a clutch, the combination of drive and driven shafts, an external clutch member on said driven shaft and having spaced-apart internal abutments, a jaw driving member fixed on said drive shaft, enlargements carried by said jaw driving member within said external clutch member, jaws slidable between the enlargements of said driving member and adapted for engagement with said external clutch member abutments, articulated toggle members between said jaws and said drive shaft, and links extending through said jaw driving member substantially parallel with the shaft axes connected to said toggle members adapted for shifting said jaws, said jaws and abutments having complemental inclined faces forming contacting surfaces during drive engagement therebetween.

2. In a clutch, the combination of a driven shaft having a socket, a drive shaft having a reduced end journaled in the socket of said driven shaft, an external clutch member mounted on the socket of said shaft, inwardly projecting abutments carried by said external clutch member, a jaw driving member fixed on said drive shaft, enlargements carried by said jaw driving member within said external clutch member, a collar on said drive shaft, jaws slidable between the confronting faces of said enlargements and adapted for engagement with the abutments of said external clutch member, toggle members connecting said jaws to said collar, and means extending through said jaw driving member and connected to said toggle members adapted for shifting said jaws, said jaws and abutments having complemental inclined faces forming contacting surfaces during drive engagement therebetween.

In testimony whereof I affix my signature in the presence of two witnesses.

GEORGE IRA WICKS.

Witnesses:
  JOHN HUGHES,
  ALFRED E. THOMAS.